Figure 1:
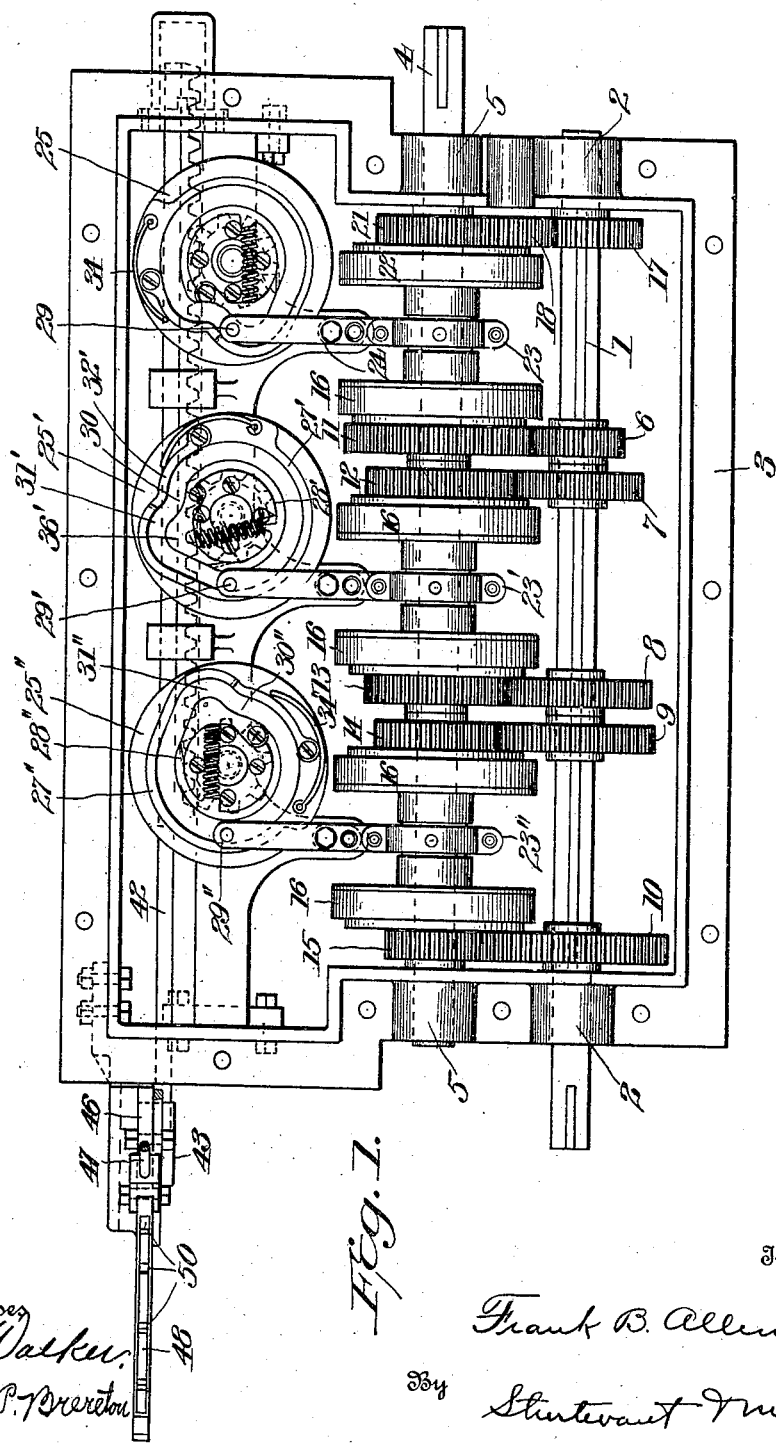

F. B. ALLEN.
CLUTCH SHIFTING MECHANISM.
APPLICATION FILED AUG. 11, 1909. RENEWED FEB. 15, 1911.

987,665.

Patented Mar. 21, 1911.

3 SHEETS—SHEET 1.

F. B. ALLEN.
CLUTCH SHIFTING MECHANISM.
APPLICATION FILED AUG. 11, 1909. RENEWED FEB. 15, 1911.
987,665.
Patented Mar. 21, 1911.
3 SHEETS—SHEET 2.
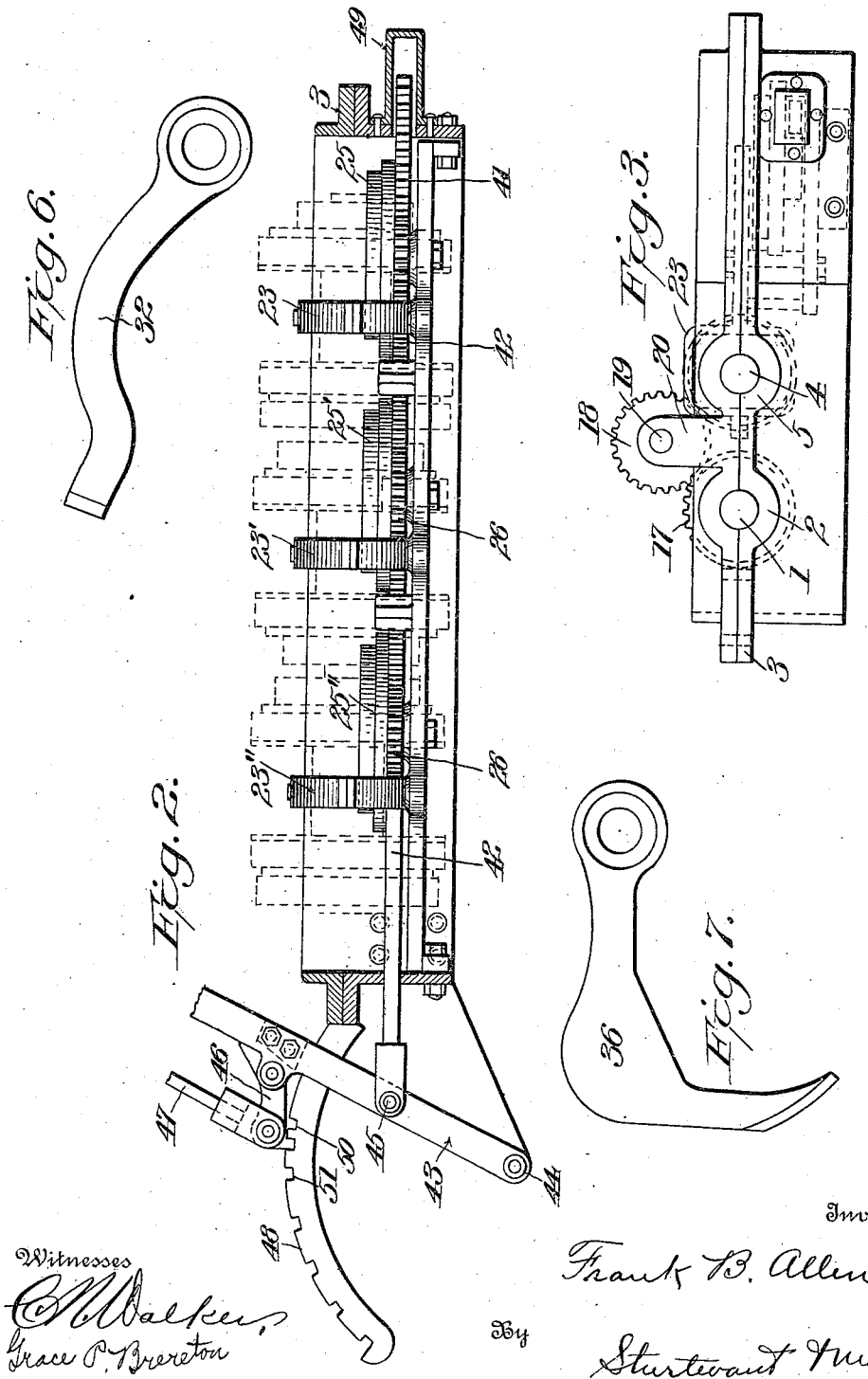
Witnesses
C. M. Walker
Grace P. Brereton
Inventor
Frank B. Allen
By
Sturtevant & Mason
Attorneys F. B. ALLEN.
CLUTCH SHIFTING MECHANISM.
APPLICATION FILED AUG. 11, 1909. RENEWED FEB. 15, 1911.
987,665.
Patented Mar. 21, 1911.
3 SHEETS—SHEET 3.
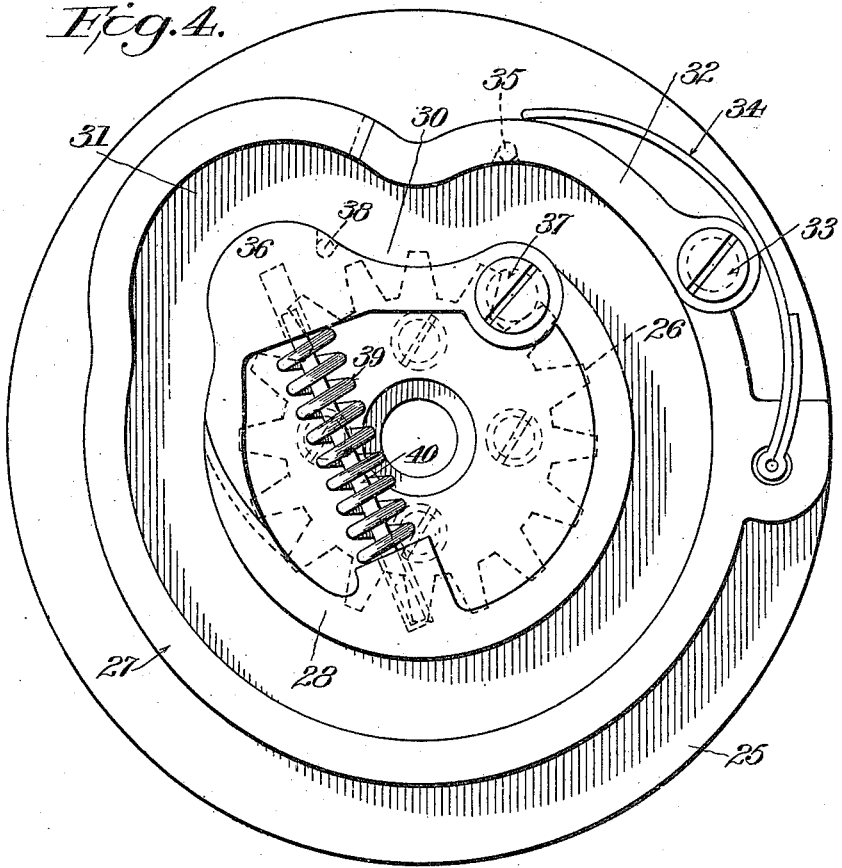
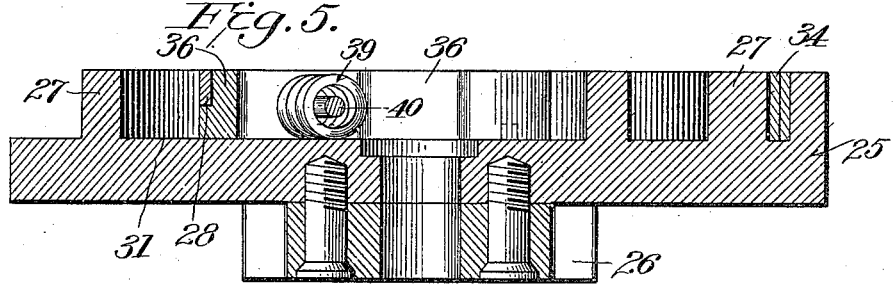
Witnesses
C. H. Walker
Grace P. Brereton
Inventor
Frank B. Allen
By Sturtevant & Mason
Attorneys
THE NORRIS PETERS CO., WASHINGTON, D. C.

UNITED STATES PATENT OFFICE.

FRANK B. ALLEN, OF SALT LAKE CITY, UTAH.

CLUTCH-SHIFTING MECHANISM.

987,665.  Specification of Letters Patent.  Patented Mar. 21, 1911.

Application filed August 11, 1909, Serial No. 512,404. Renewed February 15, 1911. Serial No. 608,803.

*To all whom it may concern:*

Be it known that I, FRANK B. ALLEN, a citizen of the United States, residing at Salt Lake City, in the county of Salt Lake, State of Utah, have invented certain new and useful Improvements in Clutch-Shifting Mechanism, of which the following is a description, reference being had to the accompanying drawing, and to the letters and figures of reference marked thereon.

The invention relates to new and useful improvements in clutch-shifting mechanism, and more especially to mechanism for shifting a plurality of clutches one after the other.

An object of the invention is to provide a clutch-shifting mechanism, wherein a plurality of rotating parts operated by a common means, may cause the clutches to be shifted in succession.

The invention consists in the parts, arrangements and improvements hereinafter shown, described and set forth in the appended claims.

In the drawings, which show by way of illustration, one embodiment of the invention,—Figure 1 is a plan view of the supporting casing showing the clutches and shifting mechanism therein; Fig. 2 is a sectional view through the casing, showing the shifting mechanism in side elevation, and showing the clutches in dotted lines; Fig. 3 is an end view of the part shown in Fig. 1; Fig. 4 is a detail showing in plan one of the rotating operating parts; Fig. 5 is a section through the rotating part; Fig. 6 is a detail of one of the yielding cam sections; Fig. 7 is a detail of another yielding cam section.

The transmission mechanism, as herein shown, comprises a shaft 1, which is mounted in suitable journals 2 in a supporting casing 3. The shaft 4 is also mounted in journals 5 in said casing. The shaft 1 is provided with a series of gears 6, 7, 8, 9 and 10, which gradually increase in diameter from the gear 6 to the gear 10. The shaft 4 has a series of gears 11, 12, 13, 14 and 15, which gradually decrease in diameter from the gear 11 to the gear 15, and the last named series of gears mesh with corresponding gears in the first named series. The gears 11, 12, 13, 14 and 15 each run free on the shaft 4, and may be connected thereto by suitable clutches 16, one of which is provided for each gear.

By clutching the various gears to the shaft 4, varying movements may be imparted from the shaft 4 to the shaft 1, or from the shaft 1 to the shaft 4, in the usual manner. The shaft 1 is preferably the driving shaft, and the shaft 4 the driven shaft, although it is obvious that either shaft may be the driving shaft or driven shaft. The shaft 1 also has a gear 17, which meshes with a gear 18 mounted on a stud 19, carried by a projecting bracket 20, formed on the casing. The gear 18 meshes with the gear 21, rotating freely on the shaft 4. When the gear 21 is clutched to the shaft 4 by means of a clutch 22, then the shaft 4 will turn in the opposite direction from the shaft 1. By this means, the usual back drive is secured.

A lever 23 is pivoted at 24 to the supporting casing, and operates when swung in one direction to cause the clutch 22 to grip its coöperating part and secure the gear wheel 21 to the shaft 4. When the lever 23 is swung in the opposite direction, said lever will cause the clutch 16 to lock the gear wheel 11 to the shaft 4. A lever 23′ operates to clutch either the gear 12 or the gear 13 to the shaft 4, depending upon the movement of the lever. A lever 23″ in a like manner operates the clutches connecting the gears 14 and 15 to the shaft 4.

As a means for operating the lever 23, I have provided a rotating cam-carrying disk 25, which is shown on an enlarged scale in Figs. 4 and 5. The cam disk is pivoted centrally thereof to a post carried by the supporting casing. Said disk on its lower face carries a gear 26. Said disk on its upper face has projecting ribs 27 and 28, which are spaced so as to form a path for a roller carried by a stud 29 on the end of the lever 23. The ribs 27 and 28 are also shaped so as to form a cam path. Said cam path at 30 is deflected inwardly toward the axis of the disk, while the cam path at 31 is deflected outwardly away from the axis of the disk. It will readily be seen, therefore, that if the disk is rotated, the lever 23 will be shifted in first one direction and then the other, by the deflected portions 30 and 31 of the cam path.

In order that the operating mechanism for the lever may yield to any excessive strain on the parts, I have provided the projecting rib 27 with a yielding portion 32. Said yielding portion is pivoted at 33, and is held by means of a spring 34 against a stop 35 carried by the supporting disk. The rib 28 also has a yielding portion 36. Said yielding portion is pivoted at 37, and is held against a stop 38 by means of a coiled spring 39, which bears against said yielding portion at one end, and against a rigid portion of the rib at its other end. A stem 40 passes centrally through the coiled spring into a recess in the yielding rib 36, and serves as a support for the coiled spring.

As a means for shifting the lever 23', I have provided a rotating disk 25', which has projecting ribs 27' and 28'. The rib 27' has a yielding portion 32', and the rib 28' has a yielding portion 36'. The lever 23' has a roller carried by a stud 29', which roller runs in the pathway between the projecting ribs. Said pathway has an inwardly deflected portion 30' and an outward deflected portion 31'. As the disk 25' is rotated, the lever 23' will be moved back and forth in the same manner as the lever 23 is operated by the rotating disk 25. The lever 23'' carries a stud 29'' carrying a roller which runs in a pathway formed by projecting ribs 27'' and 28'' supported by a rotating disk 25''. The pathway formed between the ribs is deflected outwardly at 31'' and inwardly at 30'', so that the lever 23'' will be moved back and forth as the disk 25'' is rotated. The projecting ribs 27'' and 28'' have yielding sections similar to those carried by the disk 25. The disk 25' and the disk 25'' each has a gear 26 on its lower face similar to the gear 26 carried by the disk 25.

A bar 41 reciprocates in suitable bearings in the casing 3, and has a rack 42, which engages the gears or pinions carried by the disks 25, 25' and 25''. When the bar 41 is reciprocated, the disks will be simultaneously rotated. As a means for reciprocating the bar 41, I have provided a lever 43, which is pivoted at 44 to a bracket carried by the casing, and at 45 to a coupling on the end of the bar 41. The lever 43 is of the usual construction, and carries a locking dog 46, operated by a trip link 47, which locking dog engages a rack 48, so as to hold the bar 41 in various adjusted positions. In order to protect the projecting end of the bar 41, there is a housing 49, which may be secured to the casing 3 in any suitable way.

The deflected portions of the pathway formed between the projecting ribs carried by the operating disks, are so disposed relative to each other as to engage the clutch-shifting levers one after the other. When the parts are in the position shown in Figs. 1 and 2, the clutch-shifting levers are each arranged intermediate the clutches, and each of the gears on the shaft 4 runs free. By shifting the lever 43 so as to bring the locking dog 47 into the notch 50, the disk 25 will be rotated in a clockwise direction, bringing the cam portion or deflected portion 31 of the pathway into coöperative action with the roller carried by the lever 23, swinging the outer end of the lever to the left, as viewed in Fig. 1, and causing the clutch 22 to engage its coöperative part, thus clutching the gear 21 to the shaft 4 and causing the shaft 4 to turn in the opposite direction from the shaft 1. When the lever 43 is shifted so as to cause the locking dog to engage the notch 51, the cam portion 30 of the disk 25 will be brought into operative engagement with the roller carried by the lever 23, and cause the clutch 16 to lock the gear 11 to the shaft 4. This will give the low speed. While the disk 25 has been rotated first in one direction, and then in the other, the rollers carried by the levers 23' and 23'' have moved in a concentric part of the pathway on the disks 25' and 25'', and consequently no movement has occurred in either of these levers. A further movement of the lever 43 to the left of Fig. 1 will bring the roller carried by the lever 23 into a concentric portion of the pathway, and bring the cam portion 31' of the pathway of the disk 25' into coöperative engagement with the lever 23', and cause the gear 12 to be locked or clutched to the shaft 4. A further movement of the lever 43 brings into coöperative action the cam path 30'. A still further movement of the lever 43 will in an obvious manner, cause the lever 23'' to be operated by the cam portions 31'' and 30'' of the disk 25''. It will be seen, therefore, that the rotating disks are moved simultaneously, and the operating parts carried by the disks are brought one after the other into coöperative action with the clutch-shifting levers, and the clutches one after the other caused to grip their coöperating parts, and lock the respective gears to the driven or driving shaft, as the case may be. When the parts of the clutch are positively engaged, the yielding part of the operating rib gives sufficiently to allow the disks to be turned without any binding of the parts.

It will be evident that by the movement of the lever 43, first one clutch and then another will necessarily be brought into operation successively, and it will be impossible to operate the high speed clutch without having first connected up and operated, the clutches for the intermediate speeds.

Having thus described my invention, what I claim as new and desire to secure by Letters Patent, is:

1. A clutch shifting mechanism including in combination, a plurality of gear wheels, a shaft on which said gear wheels are loosely mounted, a plurality of gear wheels coöperating respectively with the first maned gear wheels for producing different speeds, a plurality of clutches for locking said loose gear wheels to said shaft, a plurality of simultaneously rotatable members and means carried by said rotatable members for successively shifting first one clutch and then another, whereby first one gear wheel and then another is locked to said shaft, and a plurality of different speeds secured from said shaft.

2. A clutch shifting mechanism including in combination, a plurality of gear wheels, a shaft on which said gear wheels are loosely mounted, a plurality of clutches, one for each gear wheel, a plurality of levers for operating said clutches, rotatable disks, means for simultaneously rotating said disks, cams carried by said disks for operating first one lever and then another to shift said clutches in succession for locking one gear wheel and then another to said shaft, a plurality of gear wheels coöperating respectively with each of said first named gear wheels, said gear wheels being so proportioned that the shifting of said clutches will cause varying speed transmissions from one shaft to another.

3. A clutch shifting mechanism including in combination, a plurality of pairs of gears, a plurality of pairs of clutches coöperating with the pairs of gears, a shifting lever for each pair of the clutches, an operating disk for each lever, means for simultaneously operating said disks, cams carried by said disks for operating successively first one lever and then another, whereby first one gear and then another is brought into operation, a plurality of gears coöperating respectively with the first named gears, said gears being so proportioned as to transmit varying speeds in accordance with the shifting of the clutches.

4. A clutch-shifting mechanism including in combination a plurality of pairs of gears, a plurality of pairs of clutches for said gears, a lever for each pair of clutches, a disk for each lever, oppositely projecting cams carried on the lateral face of each of said disks and so disposed relative to each other as to shift one lever after the other, first in one direction and then in the other direction, whereby said clutches are operated in succession, and means for simultaneously rotating said disks.

5. A clutch-shifting mechanism including in combination, a clutch, a lever for operating said clutch, a rotating disk, means for rotating said disk, projecting ribs carried by said disks for operating said lever, said projecting ribs having a deflected portion for operating said lever when the disk is rotated, one of said ribs at the deflected portion having a yielding section for yieldingly operating said lever.

6. A clutch-shifting mechanism including in combination, a clutch, a lever for shifting said clutch, a disk, means for rotating said disk, projecting ribs carried by said disk, said projecting ribs having a deflected portion for operating the lever, one of said ribs at the deflected portion having a pivoted section, a stop for limiting the movement of said pivoted section, and a spring for normally holding said section in engagement with said stop.

7. A clutch-shifting mechanism including in combination, a pair of clutches, a lever for shifting said clutches, a rotatable disk, means for rotating said disk, projecting ribs carried by said disk for operating said lever, said projecting ribs having oppositely disposed deflected portions, whereby said lever is moved first in one direction and then the other, said ribs being provided with yielding sections, whereby said lever is yieldingly moved first in one direction and then the other.

8. A clutch-shifting mechanism including in combination, a pair of clutches, a lever for shifting said clutches, a rotatable disk, means for rotating said disk, projecting ribs carried by said disk for operating said lever, said projecting ribs having oppositely disposed deflected portions, whereby said lever is moved first in one direction and then the other, each of said ribs having a pivoted section, stops for limiting the movement of said sections, and springs for holding said sections normally in contact with said stops.

9. A clutch-shifting mechanism including in combination, a plurality of pairs of clutches, levers for operating said clutches, a disk for each pair of clutches, a gear carried by each disk, a common rack bar for engaging said gears and simultaneously rotating said disks, and cams carried by said disks for operating said levers.

10. A clutch-shifting mechanism, including in combination, a plurality of pairs of clutches, levers for operating said clutches, a disk for each pair of clutches, a gear carried by each disk, a common rack bar for engaging said gears and simultaneously rotating said disks, and spaced projecting ribs carried by said disks for operating said levers.

11. A clutch-shifting mechanism including in combination, a plurality of pairs of clutches, levers for operating said clutches, a disk for each pair of clutches, a gear carried by each disk, a common rack bar for engaging said gears and simultaneously rotating said disks, spaced projecting ribs carried by said disks for operating said levers, said ribs having yielding sections, whereby said levers are yieldingly moved first in one direction and then in the other.

12. A clutch-shifting mechanism including in combination, a plurality of pairs of clutches, a lever for each pair of clutches, a disk for each lever, a gear carried by each of said disks, a rack engaging said gears for simultaneously rotating said disks, projecting ribs carried by said disks for operating said levers, said projecting ribs having oppositely deflected portions, said ribs having yielding sections, whereby said levers one after the other are moved yieldingly first in one direction and then the other.

In testimony whereof I affix my signature, in presence of two witnesses.

FRANK B. ALLEN.

Witnesses:
FRANK E. VICKERY,
ARTHUR H. STENHOUSE.

---

Copies of this patent may be obtained for five cents each, by addressing the "Commissioner of Patents, Washington, D. C."